(12) United States Patent
Boehl et al.

(10) Patent No.: US 8,885,817 B2
(45) Date of Patent: Nov. 11, 2014

(54) NONLINEAR FEEDBACK SHIFT REGISTER AND METHOD FOR NONLINEAR SIGNATURE FORMATION

(75) Inventors: Eberhard Boehl, Reutlingen (DE); Paulius Duplys, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 258 days.

(21) Appl. No.: 13/145,324

(22) PCT Filed: Nov. 24, 2009

(86) PCT No.: PCT/EP2009/065761
§ 371 (c)(1),
(2), (4) Date: Feb. 1, 2012

(87) PCT Pub. No.: WO2010/083911
PCT Pub. Date: Jul. 29, 2010

(65) Prior Publication Data
US 2012/0121081 A1    May 17, 2012

(30) Foreign Application Priority Data

Jan. 20, 2009  (DE) .................. 10 2009 000 322

(51) Int. Cl.
  H04L 9/28    (2006.01)
  H04L 9/06    (2006.01)
  G06F 7/58    (2006.01)
(52) U.S. Cl.
  CPC ............. *G06F 7/582* (2013.01); *H04L 9/0668* (2013.01); *G06F 2207/583* (2013.01); *H04L 2209/12* (2013.01); *H04L 9/0643* (2013.01)
  USPC ............. 380/28; 713/155; 713/159; 380/277; 380/286; 726/3; 726/21; 726/33

(58) Field of Classification Search
  USPC ......... 380/28, 277, 286; 713/155, 159; 726/3, 726/21, 33
  See application file for complete search history.

(56) References Cited

U.S. PATENT DOCUMENTS

| | | | | |
|---|---|---|---|---|
| 3,949,384 | A * | 4/1976 | Lohmann ...................... 377/70 |
| 4,635,261 | A * | 1/1987 | Anderson et al. ............. 714/732 |
| 5,345,507 | A * | 9/1994 | Herzberg et al. ............... 380/28 |
| 7,388,958 | B1 * | 6/2008 | Maier ............................. 380/270 |
| 2004/0071289 | A1 * | 4/2004 | Rose et al. ....................... 380/37 |

FOREIGN PATENT DOCUMENTS

EP    0 438 322    7/1991

OTHER PUBLICATIONS

Rajesh Pendurkar et al., "Switching Activity Generation with Automated BIST Synthesis for Performance Testing of Interconnects", IEEE Transactions on Computer Aided Design of Integrated Circuits and Systems, IEEE Service Center, Piscataway, NJ, US, vol. 20, No. 9, Sep. 2001.
International Search Report for PCT/EP2009/065761, dated Jul. 12, 2010.

* cited by examiner

*Primary Examiner* — Kambiz Zand
*Assistant Examiner* — Sharif E Ullah
(74) *Attorney, Agent, or Firm* — Kenyon & Kenyon LLP (57) ABSTRACT

A nonlinear feedback shift register for creating a signature for cryptographic applications includes a sequence of series-connected flip-flops which are connected to each other for forming at least one polynomial, with the aid of at least one signal feedback having at least one operator. The flip-flops are connected to at least one switching operator for forming at least two different polynomials, the switching operator switching between the polynomials as a function of an input signal. A method for nonlinear signature formation is also provided.

19 Claims, 8 Drawing Sheets

| 16 | 17 |
|---|---|
| 10000 | 10000 |
| 01000 | 01000 |
| 00100 | 10100 |
| 10010 | 11010 |
| 01001 | 01101 |
| 10100 | 10110 |
| 11010 | 01011 |
| 01101 | 10101 |
| 00110 | 01010 |
| 10011 | 00101 |
| 11001 | 00010 |
| 11100 | 10001 |
| 11110 | 11000 |
| 11111 | 11100 |
| 01111 | 01110 |
| 00111 | 10111 |
| 00011 | 11011 |
| 10001 | 11101 |
| 11000 | 11110 |
| 01100 | 11111 |
| 10110 | 01111 |
| 11011 | 00111 |
| 11101 | 10011 |
| 01110 | 01001 |
| 10111 | 00100 |
| 01011 | 10010 |
| 10101 | 11001 |
| 01010 | 01100 |
| 00101 | 00110 |
| 00010 | 00011 |
| 00001 | 00001 |
| 10000 | 10000 |

NONLINEAR FEEDBACK SHIFT REGISTER AND METHOD FOR NONLINEAR SIGNATURE FORMATION

FIELD OF THE INVENTION

The present invention relates to a nonlinear feedback shift register having a sequence of series-connected flip-flops which are connected to each other to form at least one polynomial, with the aid of at least one signal feedback having at least one operator.

The present invention furthermore relates to a method for nonlinear signature formation, in particular for cryptographic applications, the signature being created with the aid of a nonlinear feedback shift register.

BACKGROUND

To form signatures for test purposes, linear signatures are formed for detecting errors, among other things, in order to detect one or more function errors. While linear signature formation is common and also entirely sufficient for error detection of this type, nonlinear signatures, such as the so-called hash functions, are advantageous for cryptographic methods. In nonlinear signatures, use is made of the fact that it is very difficult to calculate the original data on the basis of the signature, or the fact that it is very difficult to manipulate the data in such a way that the same signature may be generated from the original data and the manipulated data if one starts in the same initial state or a known deviation from the initial state.

It is therefore advantageous to generate the signature in a nonlinear manner or to introduce a nonlinearity into the circuit. Shift registers of the standard type and the modular type and methods of this type are known. The operator usually performs an antivalent logic operation, which results in linear feedback. Using an (aforementioned) hash function instead of the shift register makes it possible to achieve nonlinearity. However, hash functions are extremely complex to implement, necessitating an extensive calculation and a large memory.

Alternatively, one could provide a nonlinear operator instead of a linear operator in the signal feedback, the nonlinear operator performing, for example, a NAND, NOR, AND, OR function or another nonlinear function. Although this makes the signature formation as a whole nonlinear, the advantageous characteristic of a linear feedback shift register having a primitive polynomial is lost. The advantageous characteristic of the linear feedback shift register is that all assignments except for "000 . . . 0" are achieved. The use of a nonlinear operator could thus enable fewer states to be achieved and increase the probability of different data being mapped to the same signature.

SUMMARY

The present invention is characterized in that the flip-flops of the nonlinear feedback shift register are connected to at least one switching operator for the purpose of forming at least two different polynomials, the switching operator switching between the polynomials as a function of an input signal. The different polynomials may be implemented by appropriately connecting the signal feedback to the flip-flops. The switching operator, which is connected to the flip-flops and, in particular, to the signal feedback, thus acts upon the shift register as a function of the input signal in such a way that a different signal feedback or a different signal feedback loop is used, depending on the input signal. Due to the fact that the switching operation is carried out as a function of the input signal, nonlinearity is created, i.e., the signature created with the aid of the shift register is produced in a nonlinear manner if the input signal switches at least once during the formation of this signature. This also applies, in particular, if the one or more operators of the signal feedback(s) also perform(s) a linear, preferably antivalent, function. The one or more operators is/are thus suitably designed as linear operator(s). The data signal to be compressed with the aid of the shift register is suitably used as the input signal.

The switching operator is advantageously designed as a multiplexer having a nonlinear Boolean function. In special situations, the multiplexer may be designed as an AND operator and thus performs an AND function between the input signal and the selected input.

Furthermore, the multiplexer is advantageously operatively connected to an output of at least one of the flip-flops or of the linear operator of the signal feedback. The output signal of the flip-flop or of the linear operator as well as the input signal is thus supplied to the multiplexer. "Operatively connected" is understood to mean that the connection is established directly or even indirectly, for example via a further (linear) operator.

It is furthermore provided that an output of the multiplexer is operatively connected to the input of one of the flip-flops, which closes the signal feedback circuit.

To form the signature via the input signal with the aid of the advantageously nonlinear feedback shift register, an additional antivalent coupling of the input signal into the shift register is advantageously provided. The input signal is then advantageously connected antivalently to the input of one flip-flop, preferably the second series-connected flip-flop. This ensures that all transitions of the shift register are dependent on the input signal.

Alternatively, multiple input signals are additionally injected or the one input signal is additionally injected several times in parallel into the shift register, the input signals then being appropriately connected antivalently to the inputs of different flip-flops.

According to one advantageous refinement of the present invention, it is provided that the switching operator is designed in such a way that it additionally switches between the polynomials as a function of the status of the shift register or of the status of the output of the rearmost flip-flop and/or as a function of a secret key.

It is furthermore provided that the shift register or the flip-flops is/are connected in such a way that the number of flip-flops used to form the signal is additionally varied by the switching action of the switching operator.

Finally, it is provided that the flip-flops are connected to each other for the purpose of forming primitive polynomials. This ensures that all assignments of the shift register, except for the value "000 . . . 0," are achieved for the input signal before the initial state is again assumed.

The method according to the present invention is characterized in that at least two different linear feedback shift registers, between which a switching operation is carried out as a function of an input signal, are integrated into the nonlinear feedback shift register. The two linear feedback shift registers each form a preferably primitive polynomial which results in a separate linear signature. A nonlinear signature formation operation is easily carried out by switching between the polynomials or the linear feedback shift registers as a function of the input signal.

The present invention is explained in greater detail below on the basis of multiple exemplary embodiments.

DETAILED DESCRIPTION

Figure 1:
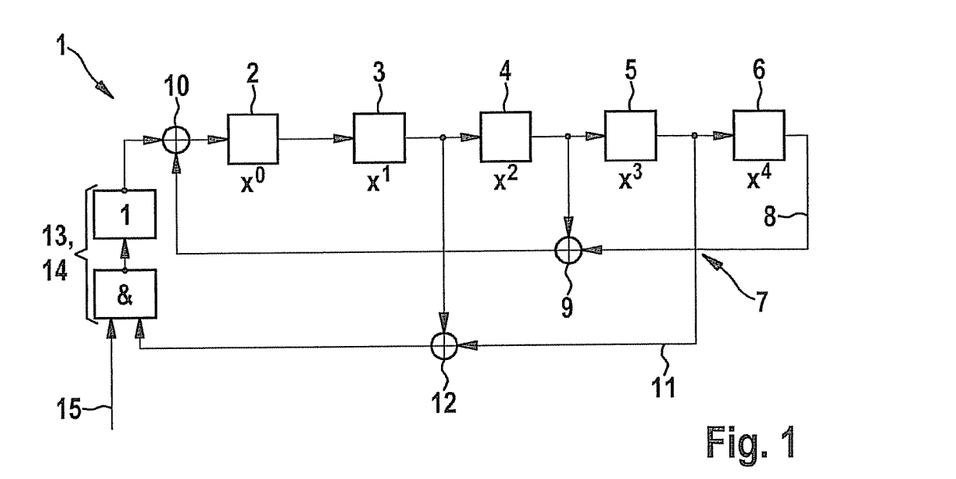
FIG. 1 shows a first exemplary embodiment of an advantageous, nonlinear feedback shift register.

FIG. 1 shows the implementation of a first exemplary embodiment of a nonlinear feedback shift register 1 in the form of a circuit. Shift register 1 has multiple series-connected flip-flops 2 through 6. Flip-flops 2 through 6 represent electronic circuits which assume two stable states and are able to store these states. Flip-flops 2 through 6 are connected to each other via a signal feedback 7, signal feedback 7 in the present case being largely provided with a two-part design:

A first loop 8 is largely formed by output signals of flip-flops 4 and 6 which are supplied to an operator 9, and by the output signal which results from operator 9 and is supplied to an operator 10. Second loop 11 supplies the output signals of flip-flops 3 and 5 to an operator 12 whose output signal is supplied to a switching operator 13 whose output signal, in turn, is supplied to operator 10. Operators 9, 10, and 12 each perform the so-called EXOR function (EXCLUSIVE-OR function), which gates antivalently the signals of particular loops 8, 11 of signal feedback 7. Switching operator 13 is designed as a multiplexer 14 which, in the particular case of this exemplary embodiment, is formed by an AND function which is illustrated by a NAND and subsequent inversion. Switching operator 13 receives the output signal of operator 12 and an input signal 15 as input signals. The input signal is, for example, the signal for whose data the signature is to be created with the aid of shift register 1. While operators 9, 10 and 12 perform linear, antivalent operations, switching operator 13 or multiplexer 14 performs a nonlinear operation. Different polynomials are set or used as a function of input signal 15, with the aid of flip-flops 2 through 6 and the different loops 8, 11 of signal feedback 7. For clarification, the different polynomials are first examined separately below.

Figure 2:
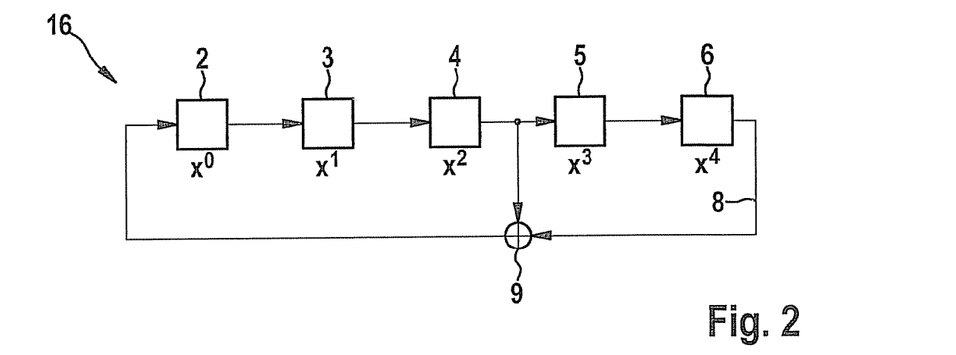
FIG. 2 shows a first linear feedback shift register.

For this purpose, FIG. 2 shows a linear feedback shift register 16 (standard type) having polynomial $x^5+x^2+1$. Linear feedback shift register 16 largely represents flip-flops 2 through 6 of above-described shift register 1, which are connected by loop 8.

Figure 3:
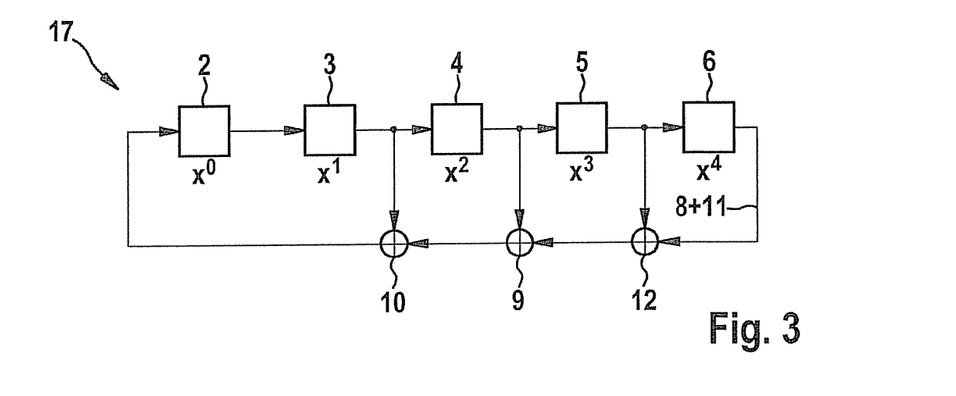
FIG. 3 shows a second linear feedback shift register.

FIG. 3 shows a second linear feedback shift register 17 (standard type) having polynomial $x^5+x^3+x^2+x+1$. Further linear feedback shift register 17 is also found in nonlinear feedback shift register 1 in the form of a logic operation between loops 8 and 11 without switching operator 13.

With the aid of advantageous switching operator 13 of nonlinear feedback shift register 1, it is possible to easily switch between the polynomials of shift registers 16 and 17 as a function of input signal 15. In other words, the present invention provides for the fact that the polynomials represented in FIGS. 2 and 3 are implemented in a shift register and switching between these two polynomials is carried out depending on the value of input signal 15. For example, if the value of the input signal is equal to zero, the polynomial of linear shift register 16 is used; if the value of the input signal is equal to one, the polynomial of linear feedback shift register 17 is used for the feedback function.

Figure 4:
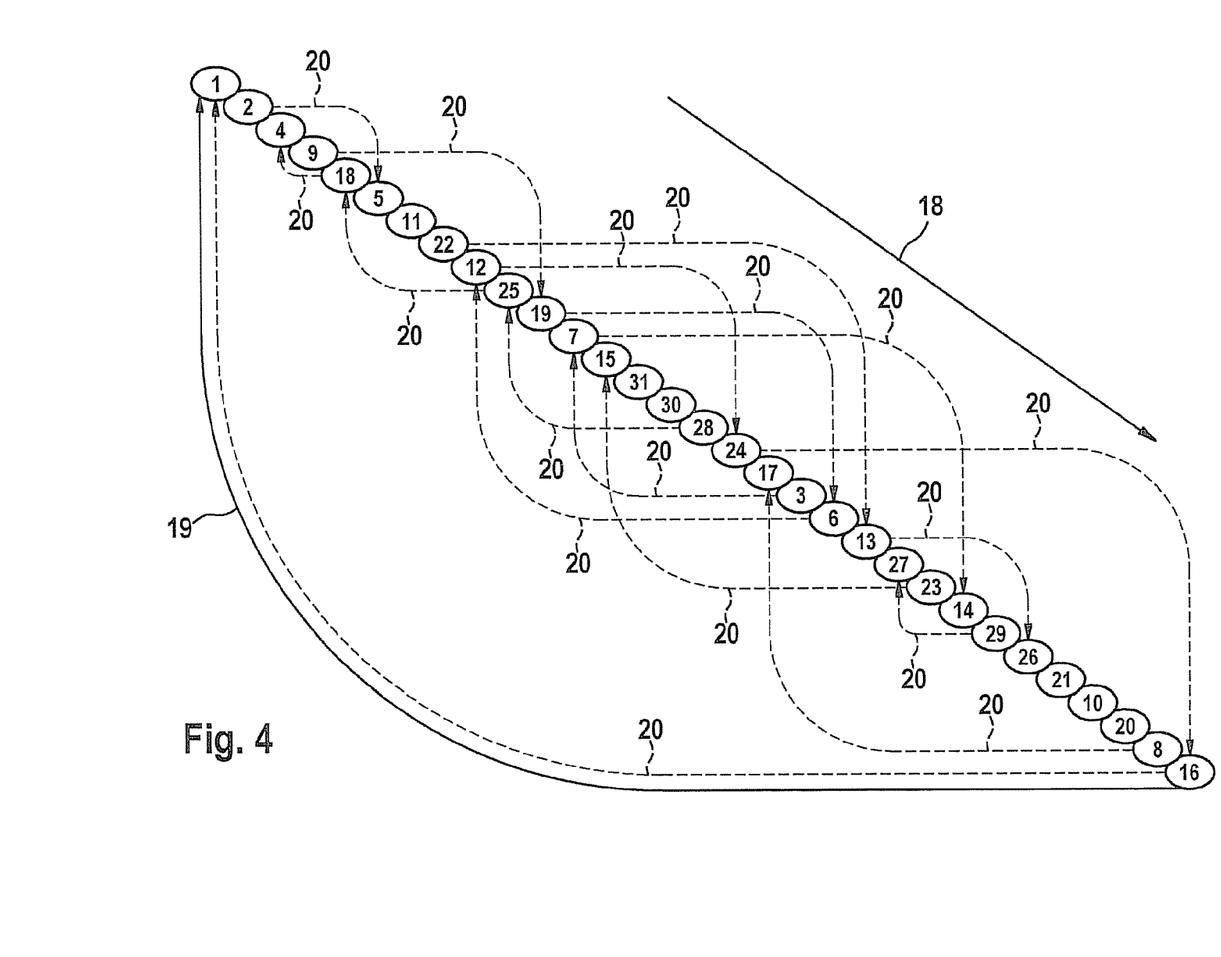
FIG. 4 shows a transition graph for the first and second linear feedback shift registers.

FIG. 4 shows a schematic representation of a transition graph for the two linear feedback shift registers 16 and 17. The adjacent states at the bottom right are always assumed as the subsequent states for linear feedback shift register 16, as shown by a solid arrow 18. The transition back to the first state from the last state is then carried out, as shown by a further solid arrow 19. The transitions for linear feedback shift register 17 are shown by broken arrow 20, only one of these transitions being provided with a reference numeral for reasons of clarity. If no broken arrow extends away from a state, the states at the bottom right are also reached as subsequent states in this case.

Figure 5:
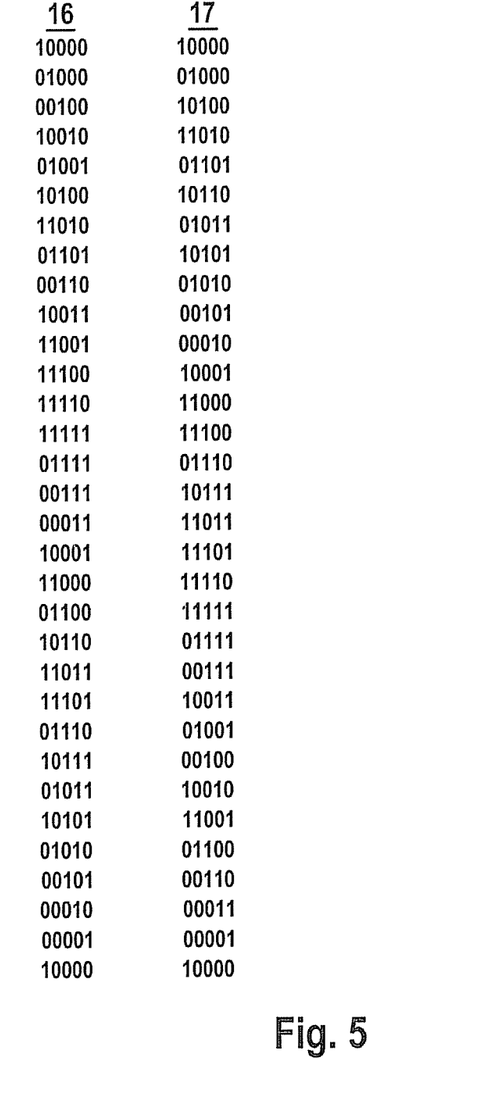
FIG. 5 shows a tabular simulation of the first and second shift registers.

FIG. 5 shows a corresponding simulation of the two linear feedback shift registers 16, 17 having the same starting value "10000," the left column showing the values for shift register 16 and the right column showing the values for shift register 17. In both cases, the simulation results in the same starting value after 31 cycles of shift operations, this starting value not being achieved in the interim. While both polynomials of shift registers 16, 17 are primitive polynomials, the intermediate states are passed through in different sequences, as shown in the table and also in the transition graph in FIG. 4.

The transitions for the decimal values of the assignments of shift register 16 or 17 are as follows: In each case, the left bit in shift registers 16, 17 is defined as the LSB (least significant bit), and the right bit is defined as the MSB (most significant bit) for forming the decimal value. For linear feedback shift register 16, the transitions thus take place in the following order:

1-2-4-9-18-5-11-22-12-25-19-7-15-31-30-28-24-17-3-6-13-27-23-14-29-26-21-10-20-8-16 and back to state 1.

For linear feedback shift register 17 illustrated in FIG. 3, the transitions take place in the following order:

1-2-5-11-22-13-26-21-10-20-8-17-3-7-14-29-27-23-15-31-30-28-25-18-4-9-19-6-12-24-16 and back to state 1.

Figure 6:
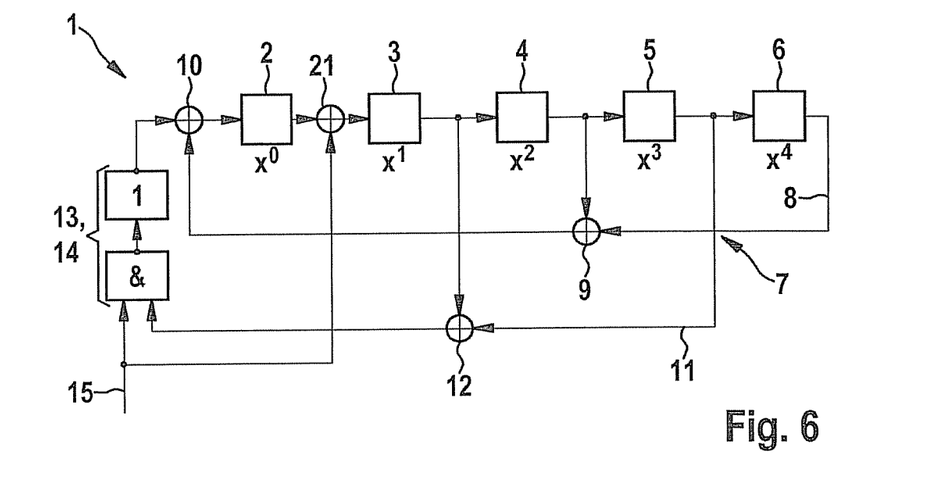
FIG. 6 shows an advantageous refinement of the nonlinear feedback shift register.

As is easily seen from the transition graph in FIG. 4, not all transitions for nonlinear feedback shift register 1 are dependent on input signal 15 because, in this circuit, only the feedback polynomials are switched as a function of input signal 15. To form the signature via input signal 15, an additional antivalent coupling of input signal 15 is therefore reasonable, as shown in FIG. 6, in an advantageous refinement of shift register 1. An NLMISR (nonlinear multiple input shift register) is formed thereby. For this purpose, an additional connection runs from input signal 15 to an input of a (linear) operator 21, which is situated between flip-flops 2 and 3. Input signal 15 is thus coupled antivalently between flip-flops 2 and 3.

It is, of course, also conceivable to introduce additional input signals into the circuit in parallel, these input signals then being linked antivalently to the inputs of the other flip-flops.

Figure 7:
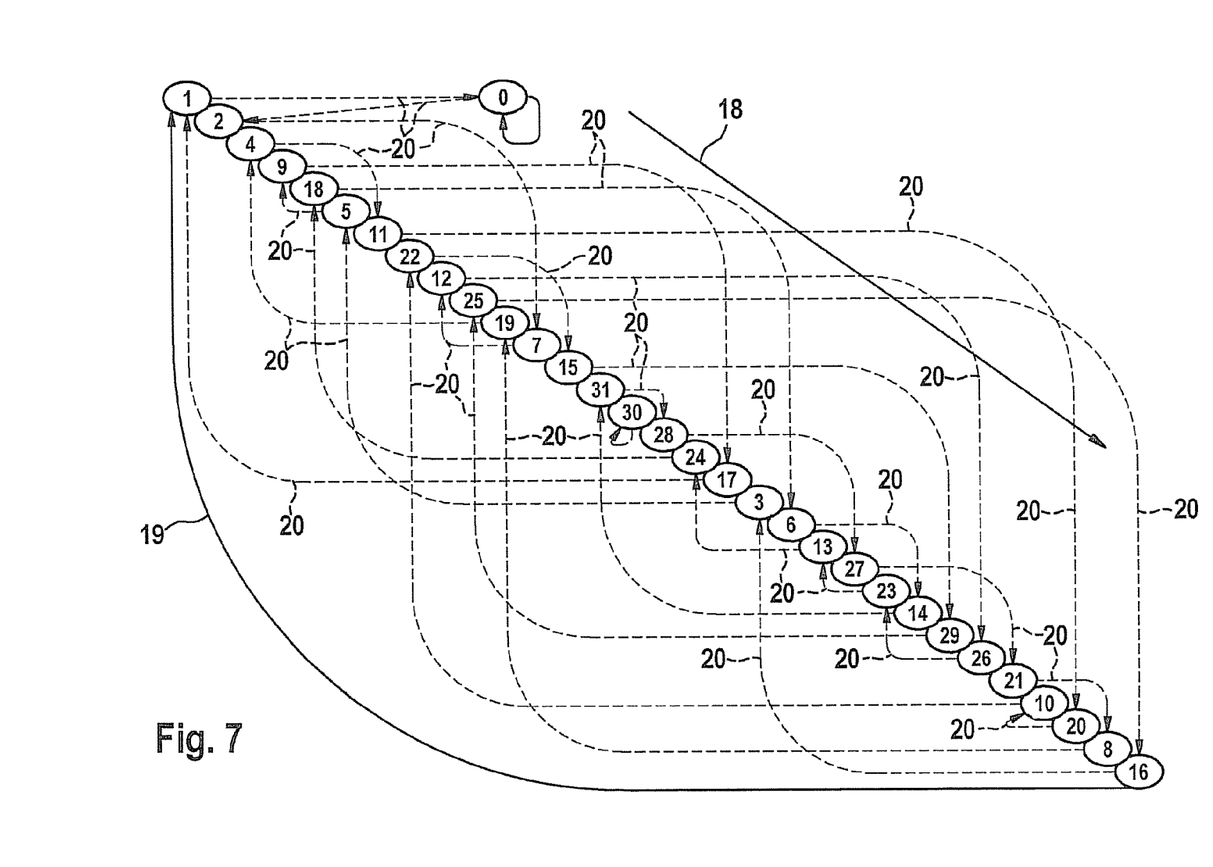
FIG. 7 shows a transition graph for the nonlinear feedback shift register from FIG. 6.

FIG. 7 shows a transition graph for nonlinear feedback shift register 1 from FIG. 6. Once again, solid arrows 18, 19 represent the polynomial of shift register 16, corresponding to an input signal having a value of "zero," and broken arrow 20 represents the transitions for linear feedback shift register 17 corresponding to an input signal having a value of "one." In this case, the transition to the adjacent status at the bottom right (arrow 18) now applies only to an input signal having a value of "zero." It should be noted as a special feature in this case that a state "0" is achieved from state 1 for an input signal having the value "one." The method leaves this state only if the input signal is equal to "one." A further special feature is that, in state "30," an input signal having a value of "one" causes the state to remain unchanged.

For nonlinear shift register 1 according to FIG. 6, the transitions for an input signal having a value of "zero" take place in the same order as for linearly coupled shift register 16. However, the following sequence applies to an input signal having a value of "one":

1-0-2-7-12-26-23-13-24-18-6-14-31-28-27-21-8-19-4-11-20-10-22-15-29-25-16-3-5-9-17 and back to state 1.

Figure 8:
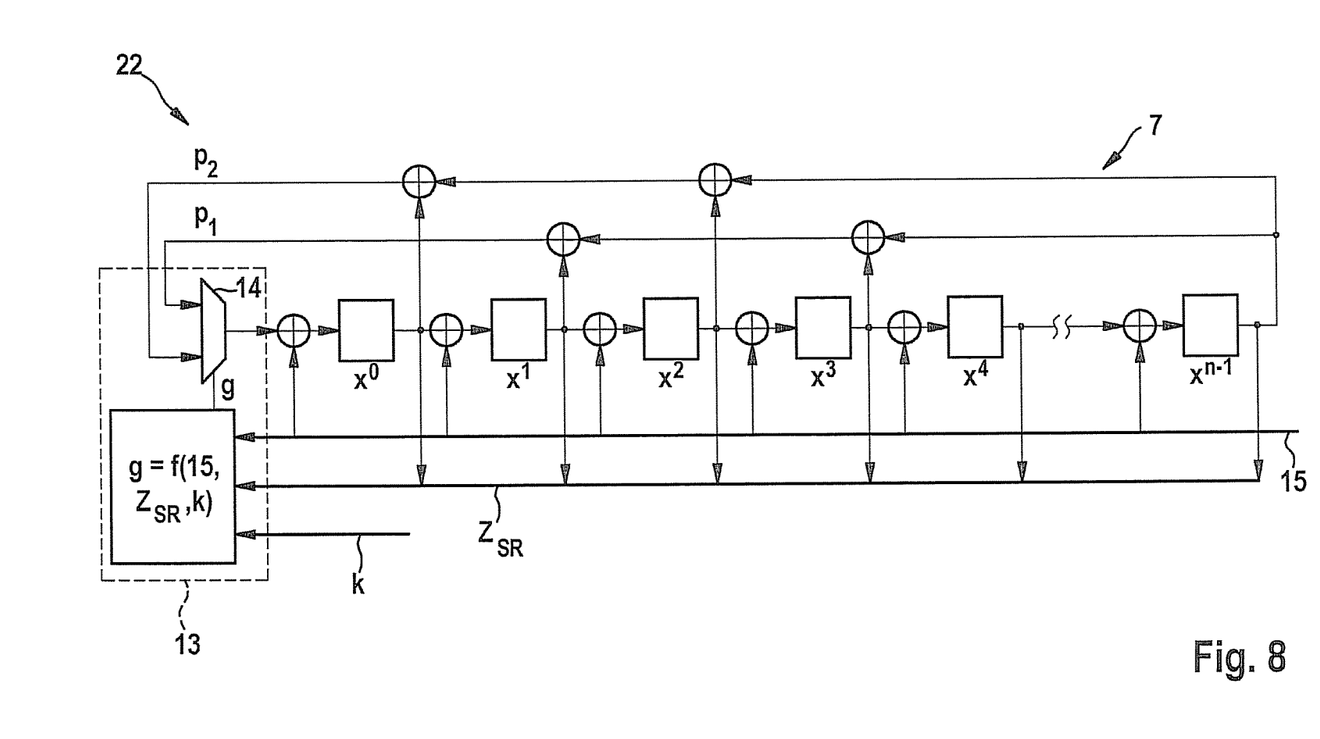
FIG. 8 shows an exemplary embodiment of a generalized, advantageous, nonlinear feedback shift register (standard type).

In a generalized specific embodiment of the circuit according to the present invention of nonlinear feedback shift register 1, as generally illustrated in FIG. 8 as shift register 22 (NLMISR), it is possible to picture a switching operator having any function g which switches between two (preferably primitive) polynomials or polynomial functions $p_1$, $p_2$, this function g depending on input signals $0 \ldots n-1$, the state of shift register $Z_{SR}$ (the values of all flip-flops ($x^0 \ldots x^{n-1}$)) and, if necessary, also on a secret key (k).

It is furthermore advantageous for NLMISR 22 to be placed in a defined initial state in the beginning, for example using a reset signal. It is possible to use a known starting value or a starting value which is directly or indirectly dependent on a secret key or the secret key. In the exemplary embodiment illustrated in FIG. 8, multiplexer 14 activates polynomial function $p_1$ for g=0 and polynomial function $p_2$ for g=1.

The detailed interconnection of nonlinear feedback shift register 22 may be taken directly from the self-explanatory FIG. 8, the illustrated (linear) operators (which are represented by the same symbol as in the preceding figures) also producing an antivalent operation (EXOR).

Figure 9:
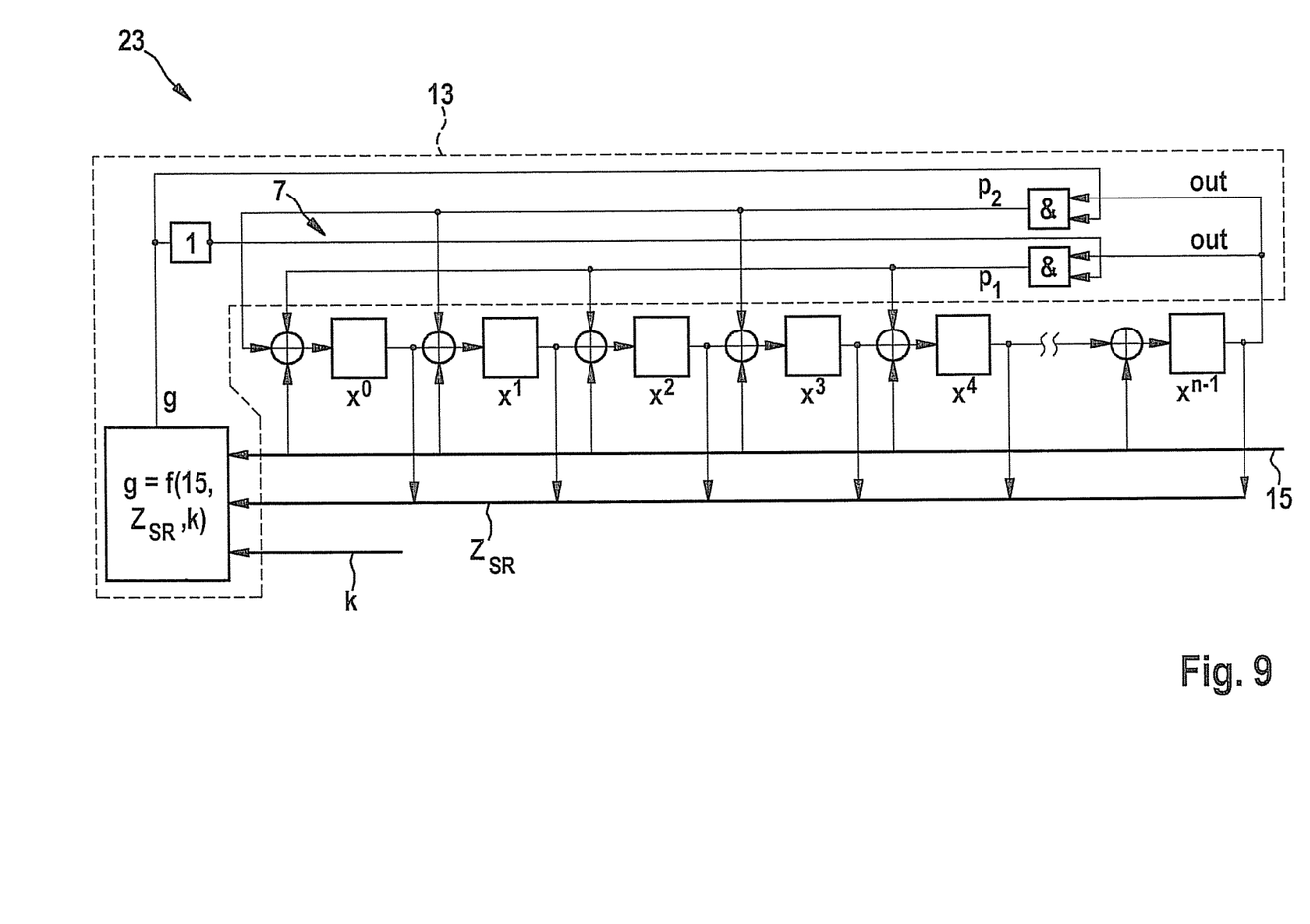
FIG. 9 shows a further exemplary embodiment of a generalized, advantageous, nonlinear feedback shift register (modular type).

FIG. 9 shows a general implementation of a nonlinear feedback shift register 23 in the form of circuitry, having multiple input signals (NLMISR) for the modular type. In this case, signal g=1 activates polynomial function $p_2$, while polynomial function $p_1$ is activated for g=0. The activation is carried out with the aid of AND functions $p_2$=g & out and $p_1$=/g & out. The AND function may be implemented as a NAND function and a subsequent inversion (as also shown in FIG. 6). The interventions in shift register 23 are provided according to the selected (primitive) polynomials.

Different lengths of the integrated shift register or polynomials are also possible, i.e., one flip-flop or multiple flip-flops are separated during generation of a polynomial or during switching.

Figure 10:
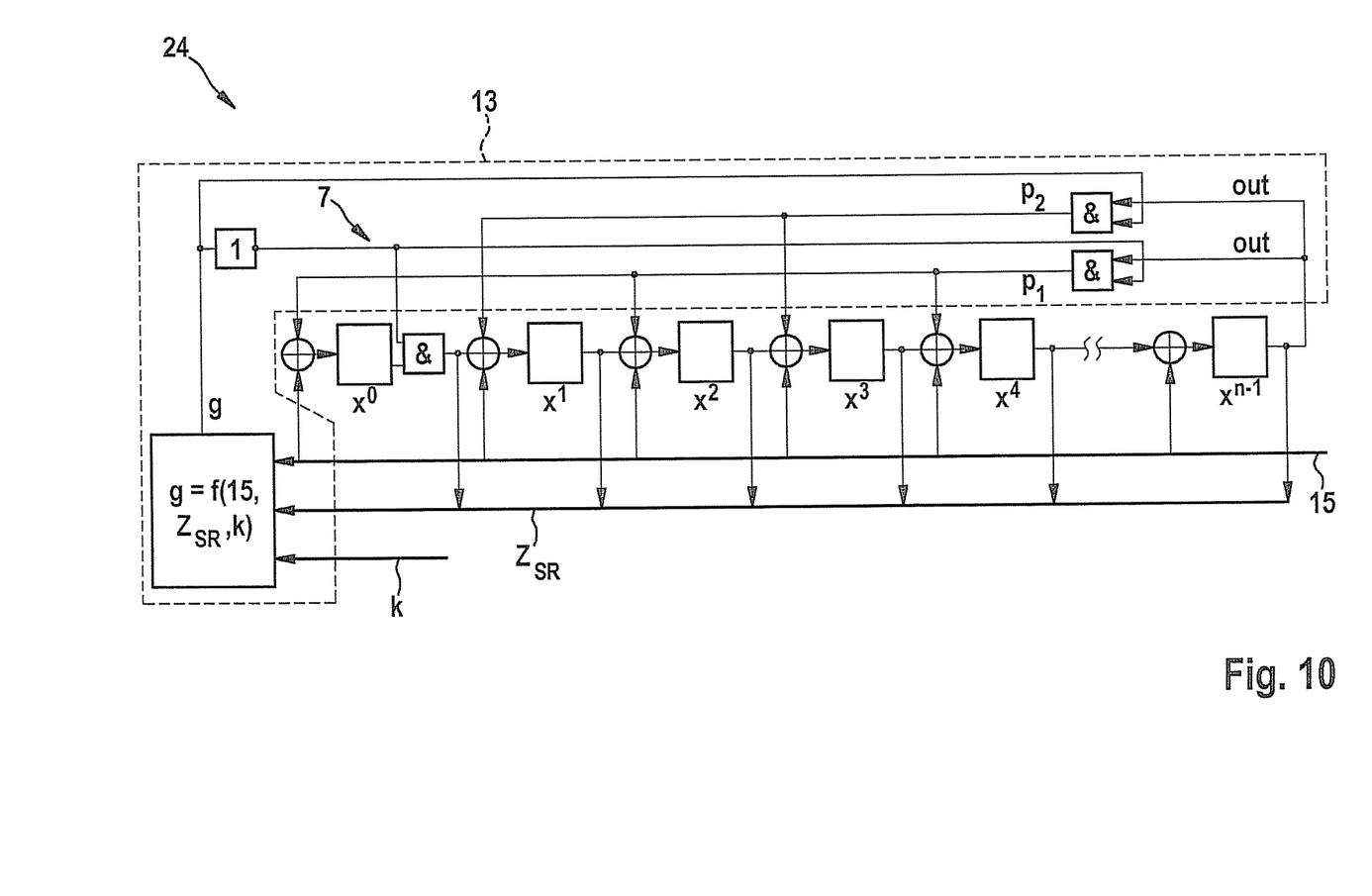
FIG. 10 shows a further exemplary embodiment of a generalized, advantageous, nonlinear feedback shift register (modular type) having different polynomial lengths.

FIG. 10 shows a nonlinear feedback shift register 24 (module type), an AND operation having correspondingly inverted or non-inverted signal g being provided at the output of first flip-flop $x^0$, in contrast to the preceding exemplary embodiment. In this exemplary embodiment, polynomial function $p_2$ has only one bit position less than polynomial function $p_1$. It is, of course, also conceivable to provide more than two polynomials and to switch between them.

Figure 11:
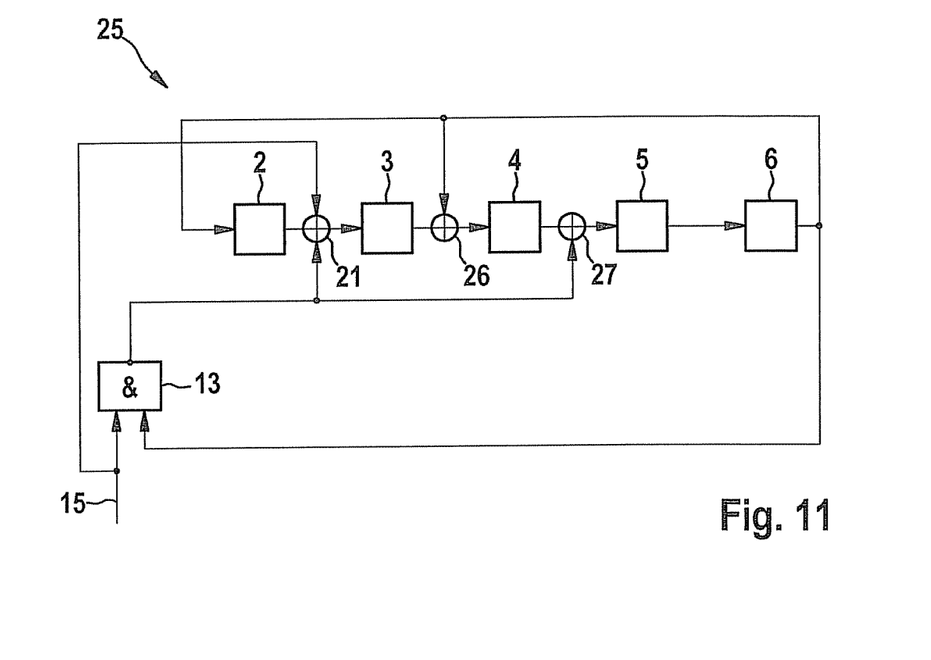
FIG. 11 shows the shift register from FIG. 6 as a modular type.

FIG. 11 shows a further exemplary embodiment of an advantageous nonlinear feedback shift register 25, which largely corresponds to shift register 1 from FIG. 6, known elements being provided with the same reference numerals so that reference is made, in this respect, to the above description. While shift register 1 is designed as a standard type which has at least one signal feedback which supplies the outputs of at least two different flip-flops (4, 6; 3, 5) to an operator (9; 12) whose output is operatively connected to the input of at least one of the flip-flops (2), shift register 25, in contrast thereto, represents a specific embodiment in the form of a modular type in which the output of at least one, preferably the rearmost flip-flop (6), is directly or indirectly connected to inputs of multiple other flip-flops (1, 3), the same different polynomials being implemented as in the standard type. The main difference lies in the fact that the signal feedback runs in the opposite direction in shift register 25. In this case, in addition to linear operator 21, only linear operators 26 and 27 are situated between flip-flops 3 and 4 (26) and 4 and 5 (27). The output signal of rearmost flip-flop 6 is supplied to first flip-flop 2 and linear operator 26, on the one hand, and to switching operator 13, which in the present case performs a simple AND operation, on the other hand. This AND operation may be implemented by a NAND operation and subsequent inversion (13, 14), as shown in FIG. 1. The output of switching operator 13 supplies the result of the logic operation to linear operators 21 and 27.

What is claimed is:

1. A nonlinear feedback shift register for creating a signature for cryptographic applications, comprising:
a sequence of series-connected flip-flops connected to each other in a manner such that the sequence of series-connected flip-flops is configured to form at least one polynomial with the aid of at least one signal feedback having at least one operator,
wherein the flip-flops are connected to at least one switching operator in order to form at least two different polynomials, the switching operator configured to switch between the at least two different polynomials as a function of an input signal that is to-be shifted by the nonlinear feedback shift register, wherein the nonlinear feedback shift register is configured such that the input signal is additionally antivalently coupled into the nonlinear feedback shift register by logically combining the input signal with an existing value stored in the nonlinear feedback shift register, using an XOR operation.

2. This shift register as recited in claim 1, wherein the switching operator is a multiplexer having a nonlinear Boolean function.

3. The shift register as recited in claim 2, wherein the multiplexer is an AND operator.

4. The shift register as recited in claim 1, wherein the operator of the signal feedback is a linear operator.

5. The shift register as recited in claim 2, wherein the multiplexer is connected to an output of at least one of (a) one of the flip-flops and (b) the linear operator of the signal feedback.

6. The shift register as recited in claim 2, wherein an output of the multiplexer is connected to an input of one of the flip-flops.

7. The shift register as recited in claim 1, wherein the shift register is configured such that multiple input signals are coupled into the shift register in parallel.

8. The shift register as recited in claim 7, wherein the multiple input signals are antivalently connected to inputs of different flip-flops.

9. The shift register as recited in claim 1, wherein the switching operator is configured to switch between the polynomials at least one of (a) as a function of a state of the shift register and (b) as a function of a secret key.

10. The shift register as recited in claim 1, wherein the flip-flops are interconnected to form each of the at least two different polynomials as a primitive polynomial.

11. The shift register as recited in claim 1, wherein the shift register is interconnected in such a way that the number of flip-flops that form each the at least two different polynomials varies between different ones of the polynomials, so that the number of flip-flops used depends on the switching performed by the switching operator.

12. A method for nonlinear signature formation, the nonlinear signature being created with the aid of a nonlinear feedback shift register, comprising:
   integrating at least two different polynomials or linear feedback shift registers, between which a switching operation is carried out as a function of an input signal that is to-be shifted by the nonlinear feedback shift register, wherein the nonlinear feedback shift register is configured such that the input signal is additionally antivalently coupled into the nonlinear feedback shift register; and
   performing the antivalent coupling by logically combining the input signal with an existing value stored in the nonlinear feedback shift register, using an XOR operation.

13. The method as recited in claim 12, wherein the method is performed as part of a cryptographic application.

14. The method as recited in claim 12, wherein the switching operation is carried out as a function of a secret key.

15. The method as recited in claim 12, further comprising:
   generating a control signal by which a multiplexer selects one of the at least two different polynomials or linear feedback shift registers to perform the switching operation, the control signal being generated as a function of a secret key.

16. The shift register as recited in claim 2, wherein the switching operator generates a control signal by which the multiplexer selects one of the at least two different polynomials, the control signal being generated as a function of a secret key.

17. The shift register as recited in claim 1, wherein the input signal is antivalently coupled by logically combining the input signal with an existing value stored in the nonlinear feedback shift register.

18. The shift register as recited in claim 1, wherein the antivalent coupling occurs before the input signal is applied to an earliest one of the flip-flops in the sequence.

19. The method as recited in claim 12, wherein the antivalent coupling occurs before the input signal is applied to an earliest storage element in a sequence of storage elements in the nonlinear feedback shift register.

* * * * *